(12) United States Patent
Pourtout

(10) Patent No.: US 7,727,292 B2
(45) Date of Patent: Jun. 1, 2010

(54) METHOD FOR OPERATING AN INTERNAL COMBUSTION ENGINE UTILIZING A CARBOHYDRATE-BASED FUEL MIXTURE

(76) Inventor: Guillaume Pourtout, 86 Avenue de Villiers, 75017 Paris (FR)

(*) Notice: Subject to any disclaimer, the term of this patent is extended or adjusted under 35 U.S.C. 154(b) by 1015 days.

(21) Appl. No.: 11/449,608

(22) Filed: Jun. 9, 2006

(65) Prior Publication Data

US 2007/0094923 A1 May 3, 2007

Related U.S. Application Data

(62) Division of application No. 10/297,623, filed as application No. PCT/FR01/01905 on Jun. 19, 2001, now Pat. No. 7,201,781.

(30) Foreign Application Priority Data

Jun. 20, 2000 (FR) .................................. 00 07833

(51) Int. Cl.
*C10L 5/00* (2006.01)

(52) U.S. Cl. ........................................................ 44/500
(58) Field of Classification Search ................... 44/500
See application file for complete search history.

(56) References Cited

FOREIGN PATENT DOCUMENTS

WO    WO 81/03336    * 11/1981

* cited by examiner

*Primary Examiner*—Edward J Cain
(74) *Attorney, Agent, or Firm*—Dennison, Schultz & MacDonald

(57) ABSTRACT

A method for operating an internal combustion engine utilizing a fuel mixture containing a suspension in air at a concentration of about 200 mg of fuel per liter of air, of a solid fuel including at least one of a cereal flour, a cotton flour, a soybean flour, a potato flour, a cassava flour, a dehydrated chocolate powder and a dehydrated milk powder, the solid fuel being in the form of a powder having an average particle diameter and median particle diameter at least 150 μm.

26 Claims, 11 Drawing Sheets

| Diameter of particle size class (left) μm | 6015-2.$01 Diff. Volume % | 6015-2.$02 Diff. Volume % | Diameter of particle size class (left) μm | 6015-2.$01 Diff. Volume % | 6015-2.$02 Diff. Volume % |
|---|---|---|---|---|---|
| 0.429 | 0 | 0 | 28.28 | 0.094 | 0 |
| 0.470 | 0 | 0 | 30.98 | 0.091 | 0 |
| 0.515 | 0 | 0 | 33.94 | 0.087 | 0 |
| 0.564 | 0 | 0 | 37.17 | 0.085 | 0 |
| 0.618 | 0 | 0 | 40.71 | 0.088 | 0 |
| 0.677 | 0 | 0 | 44.60 | 0.096 | 0 |
| 0.741 | 0 | 0 | 48.85 | 0.111 | 0 |
| 0.812 | 0 | 0 | 53.50 | 0.137 | 0.008 |
| 0.889 | 0 | 0 | 58.60 | 0.174 | 0.088 |
| 0.974 | 0 | 0 | 64.19 | 0.214 | 0.194 |
| 1.066 | 0 | 0 | 70.31 | 0.263 | 0.204 |
| 1.168 | 0 | 0 | 77.01 | 0.348 | 0.202 |
| 1.279 | 4.1E-7 | 0 | 84.36 | 0.490 | 0.243 |
| 1.401 | 3.6E-5 | 0 | 92.40 | 0.708 | 0.328 |
| 1.535 | 0.0029 | 0 | 101.2 | 1.04 | 0.508 |
| 1.681 | 0.001 | 0 | 110.8 | 1.52 | 0.861 |
| 1.842 | 0.002 | 0 | 121.4 | 2.14 | 1.34 |
| 2.017 | 0.003 | 0 | 133.0 | 2.84 | 1.85 |
| 2.210 | 0.004 | 0 | 145.6 | 3.56 | 2.37 |
| 2.420 | 0.006 | 0 | 159.5 | 4.25 | 2.93 |
| 2.651 | 0.009 | 0 | 174.7 | 4.84 | 3.47 |
| 2.904 | 0.011 | 0 | 191.4 | 5.29 | 3.93 |
| 3.181 | 0.015 | 0 | 209.6 | 5.58 | 4.33 |
| 3.484 | 0.018 | 0 | 229.6 | 5.71 | 4.68 |
| 3.816 | 0.021 | 0 | 251.5 | 5.70 | 4.96 |
| 4.180 | 0.025 | 0 | 275.5 | 5.60 | 5.17 |
| 4.579 | 0.029 | 0 | 301.8 | 5.47 | 5.37 |
| 5.015 | 0.032 | 0 | 330.5 | 5.34 | 5.59 |
| 5.493 | 0.036 | 0 | 362.0 | 5.19 | 5.75 |
| 6.017 | 0.040 | 0 | 396.6 | 4.94 | 5.81 |
| 6.591 | 0.045 | 0 | 434.4 | 4.59 | 5.77 |
| 7.219 | 0.050 | 0 | 475.8 | 4.14 | 5.59 |
| 7.907 | 0.056 | 0 | 521.1 | 3.64 | 5.28 |
| 8.661 | 0.062 | 0 | 570.8 | 3.24 | 4.91 |
| 9.486 | 0.067 | 0 | 625.2 | 2.87 | 4.37 |
| 10.39 | 0.071 | 0 | 684.8 | 2.70 | 4.32 |
| 11.38 | 0.073 | 0 | 750.1 | 2.77 | 4.82 |
| 12.46 | 0.074 | 0 | 821.6 | 2.66 | 4.76 |
| 13.65 | 0.073 | 0 | 899.9 | | |
| 14.95 | 0.071 | 0 | | | |
| 16.38 | 0.070 | 0 | | | |
| 17.94 | 0.071 | 0 | | | |
| 19.65 | 0.074 | 0 | | | |
| 21.52 | 0.081 | 0 | | | |
| 23.58 | 0.088 | 0 | | | |
| 25.82 | 0.094 | 0 | | | |

FIG.3Bis

| Diameter of particle size class (left) μm | 6015-1.$01 Diff. Volume % | 6015-1.$02 Diff. Volume % | Diameter of particle size class (left) μm | 6015-1.$01 Diff. Volume % | 6015-1.$02 Diff. Volume % |
|---|---|---|---|---|---|
| 0.429 | 0 | 0 | 28.28 | 0.205 | 0.207 |
| 0.470 | 0 | 0 | 30.98 | 0.232 | 0.239 |
| 0.515 | 0 | 0 | 33.94 | 0.250 | 0.244 |
| 0.564 | 0 | 0 | 37.17 | 0.262 | 0.244 |
| 0.618 | 0 | 0 | 40.71 | 0.281 | 0.265 |
| 0.677 | 0 | 0 | 44.60 | 0.313 | 0.321 |
| 0.741 | 0 | 0 | 48.85 | 0.362 | 0.400 |
| 0.812 | 0 | 0 | 53.50 | 0.422 | 0.460 |
| 0.889 | 0 | 0 | 58.60 | 0.489 | 0.485 |
| 0.974 | 0 | 0 | 64.19 | 0.570 | 0.526 |
| 1.066 | 0 | 0 | 70.31 | 0.674 | 0.629 |
| 1.168 | 0 | 0 | 77.01 | 0.797 | 0.788 |
| 1.279 | 0 | 0 | 84.36 | 0.934 | 0.973 |
| 1.401 | 0 | 0 | 92.40 | 1.10 | 1.18 |
| 1.535 | 0 | 0 | 101.2 | 1.33 | 1.45 |
| 1.681 | 0 | 0 | 110.8 | 1.64 | 1.77 |
| 1.842 | 0 | 0 | 121.4 | 2.01 | 2.14 |
| 2.017 | 0 | 0 | 133.0 | 2.43 | 2.56 |
| 2.210 | 0 | 0 | 145.6 | 2.93 | 3.06 |
| 2.420 | 0 | 0 | 159.5 | 3.53 | 3.68 |
| 2.651 | 0 | 0 | 174.7 | 4.20 | 4.38 |
| 2.904 | 0 | 0 | 191.4 | 4.89 | 5.11 |
| 3.181 | 0 | 0 | 209.6 | 5.54 | 5.79 |
| 3.484 | 0 | 0 | 229.6 | 6.11 | 6.36 |
| 3.816 | 0 | 0 | 251.5 | 6.54 | 6.72 |
| 4.180 | 0 | 0 | 275.5 | 6.80 | 6.88 |
| 4.579 | 0 | 0 | 301.8 | 6.85 | 6.84 |
| 5.015 | 0 | 0 | 330.5 | 6.70 | 6.61 |
| 5.493 | 0 | 0 | 362.0 | 6.30 | 6.17 |
| 6.017 | 0 | 0 | 396.6 | 5.68 | 5.51 |
| 6.591 | 0 | 0 | 434.4 | 4.90 | 4.68 |
| 7.219 | 0.001 | 0 | 475.8 | 4.04 | 3.79 |
| 7.907 | 0.011 | 0 | 521.1 | 3.19 | 2.92 |
| 8.661 | 0.025 | 0 | 570.8 | 2.39 | 2.14 |
| 9.486 | 0.036 | 0 | 625.2 | 1.68 | 1.47 |
| 10.39 | 0.047 | 0.003 | 684.8 | 1.14 | 0.998 |
| 11.38 | 0.055 | 0.029 | 750.1 | 0.764 | 0.712 |
| 12.46 | 0.062 | 0.061 | 821.6 | 0.513 | 0.536 |
| 13.65 | 0.066 | 0.073 | 899.9 | | |
| 14.95 | 0.069 | 0.076 | | | |
| 16.38 | 0.072 | 0.066 | | | |
| 17.94 | 0.078 | 0.058 | | | |
| 19.65 | 0.091 | 0.057 | | | |
| 21.52 | 0.110 | 0.070 | | | |
| 23.58 | 0.138 | 0.108 | | | |
| 25.82 | 0.172 | 0.158 | | | |

FIG.4Bis

| Diameter of particle size class (left) µm | 00.$05 Diff. Volume % | 00.$06 Diff. Volume % | Diameter of particle size class (left) µm | 00.$05 Diff. Volume % | 00.$06 Diff. Volume % |
|---|---|---|---|---|---|
| 0.429 | 0 | 0 | 28.28 | 0.126 | 0.119 |
| 0.470 | 0 | 0 | 30.98 | 0.117 | 0.110 |
| 0.515 | 0 | 0 | 33.94 | 0.111 | 0.103 |
| 0.564 | 0 | 0 | 37.17 | 0.109 | 0.101 |
| 0.618 | 0 | 0 | 40.71 | 0.119 | 0.110 |
| 0.677 | 0 | 0 | 44.60 | 0.143 | 0.135 |
| 0.741 | 0 | 0 | 48.85 | 0.189 | 0.181 |
| 0.812 | 0 | 0 | 53.50 | 0.262 | 0.255 |
| 0.889 | 0 | 0 | 58.60 | 0.379 | 0.372 |
| 0.974 | 0 | 0 | 64.19 | 0.565 | 0.557 |
| 1.066 | 0 | 0 | 70.31 | 0.846 | 0.838 |
| 1.168 | 0 | 0 | 77.01 | 1.24 | 1.23 |
| 1.279 | 0 | 0 | 84.36 | 1.73 | 1.72 |
| 1.401 | 0 | 0 | 92.40 | 2.30 | 2.30 |
| 1.535 | 0 | 0 | 101.2 | 2.92 | 2.92 |
| 1.681 | 0 | 0 | 110.8 | 3.55 | 3.55 |
| 1.842 | 1.6E-6 | 1.3E-6 | 121.4 | 4.13 | 4.13 |
| 2.017 | 4E-5 | 3.2E-5 | 133.0 | 4.62 | 4.62 |
| 2.210 | 0.002 | 0.0016 | 145.6 | 5.02 | 5.02 |
| 2.420 | 0.0049 | 0.0039 | 159.5 | 5.31 | 5.31 |
| 2.651 | 0.001 | 0.001 | 174.7 | 5.50 | 5.51 |
| 2.904 | 0.002 | 0.001 | 191.4 | 5.61 | 5.62 |
| 3.181 | 0.002 | 0.002 | 209.6 | 5.65 | 5.67 |
| 3.484 | 0.004 | 0.003 | 229.6 | 5.62 | 5.65 |
| 3.816 | 0.005 | 0.004 | 251.5 | 5.52 | 5.56 |
| 4.180 | 0.006 | 0.005 | 275.5 | 5.34 | 5.38 |
| 4.579 | 0.008 | 0.007 | 301.8 | 5.06 | 5.10 |
| 5.015 | 0.010 | 0.009 | 330.5 | 4.67 | 4.71 |
| 5.493 | 0.013 | 0.011 | 362.0 | 4.19 | 4.22 |
| 6.017 | 0.016 | 0.013 | 396.6 | 3.65 | 3.67 |
| 6.591 | 0.020 | 0.016 | 434.4 | 3.10 | 3.10 |
| 7.219 | 0.025 | 0.020 | 475.8 | 2.58 | 2.56 |
| 7.907 | 0.031 | 0.026 | 521.1 | 2.10 | 2.08 |
| 8.661 | 0.038 | 0.032 | 570.8 | 1.71 | 1.69 |
| 9.486 | 0.046 | 0.040 | 625.2 | 1.39 | 1.38 |
| 10.39 | 0.056 | 0.048 | 684.8 | 1.17 | 1.17 |
| 11.38 | 0.068 | 0.059 | 750.1 | 1.03 | 1.05 |
| 12.46 | 0.080 | 0.070 | 821.6 | 0.900 | 0.929 |
| 13.65 | 0.093 | 0.082 | 899.9 | | |
| 14.95 | 0.105 | 0.094 | | | |
| 16.38 | 0.117 | 0.106 | | | |
| 17.94 | 0.127 | 0.116 | | | |
| 19.65 | 0.134 | 0.124 | | | |
| 21.52 | 0.138 | 0.129 | | | |
| 23.58 | 0.137 | 0.130 | | | |
| 25.82 | 0.133 | 0.126 | | | |

FIG.5Bis

| Diameter of particle size class (left) µm | 00.$01 Diff. Volume % | 00.$02 Diff. Volume % | Diameter of particle size class (left) µm | 00.$01 Diff. Volume % | 00.$02 Diff. Volume % |
|---|---|---|---|---|---|
| 0.429 | 0 | 0 | 28.28 | 0.425 | 0.450 |
| 0.470 | 0 | 0 | 30.98 | 0.434 | 0.451 |
| 0.515 | 0 | 0 | 33.94 | 0.450 | 0.463 |
| 0.564 | 0 | 0 | 37.17 | 0.455 | 0.485 |
| 0.618 | 0 | 0 | 40.71 | 0.468 | 0.520 |
| 0.677 | 0 | 0 | 44.60 | 0.528 | 0.571 |
| 0.741 | 0 | 0 | 48.85 | 0.623 | 0.628 |
| 0.812 | 0 | 0 | 53.50 | 0.672 | 0.672 |
| 0.889 | 0 | 0 | 58.60 | 0.635 | 0.697 |
| 0.974 | 0 | 0 | 64.19 | 0.595 | 0.718 |
| 1.066 | 0 | 0 | 70.31 | 0.646 | 0.757 |
| 1.168 | 0 | 0 | 77.01 | 0.762 | 0.810 |
| 1.279 | 0 | 0 | 84.36 | 0.814 | 0.853 |
| 1.401 | 0 | 0 | 92.40 | 0.760 | 0.877 |
| 1.535 | 0 | 0 | 101.2 | 0.724 | 0.908 |
| 1.681 | 0 | 0 | 110.8 | 0.833 | 0.980 |
| 1.842 | 0 | 0 | 121.4 | 1.07 | 1.11 |
| 2.017 | 0 | 0 | 133.0 | 1.27 | 1.27 |
| 2.210 | 0 | 0 | 145.6 | 1.38 | 1.47 |
| 2.420 | 0 | 0 | 159.5 | 1.57 | 1.71 |
| 2.651 | 0 | 0 | 174.7 | 1.92 | 2.00 |
| 2.904 | 0 | 0 | 191.4 | 2.32 | 2.37 |
| 3.181 | 0 | 0 | 209.6 | 2.76 | 2.84 |
| 3.484 | 0 | 0.001 | 229.6 | 3.35 | 3.45 |
| 3.816 | 0 | 0.006 | 251.5 | 4.17 | 4.23 |
| 4.180 | 0 | 0.013 | 275.5 | 5.13 | 5.13 |
| 4.579 | 0 | 0.017 | 301.8 | 6.09 | 6.06 |
| 5.015 | 0.002 | 0.021 | 330.5 | 6.90 | 6.89 |
| 5.493 | 0.019 | 0.023 | 362.0 | 7.49 | 7.47 |
| 6.017 | 0.041 | 0.025 | 396.6 | 7.77 | 7.65 |
| 6.591 | 0.054 | 0.028 | 434.4 | 7.55 | 7.39 |
| 7.219 | 0.065 | 0.031 | 475.8 | 6.86 | 6.68 |
| 7.907 | 0.072 | 0.036 | 521.1 | 5.85 | 5.65 |
| 8.661 | 0.079 | 0.044 | 570.8 | 4.61 | 4.45 |
| 9.486 | 0.084 | 0.056 | 625.2 | 3.27 | 3.22 |
| 10.39 | 0.094 | 0.074 | 684.8 | 2.26 | 2.23 |
| 11.38 | 0.111 | 0.100 | 750.1 | 1.62 | 1.47 |
| 12.46 | 0.142 | 0.136 | 821.6 | 1.20 | 0.953 |
| 13.65 | 0.190 | 0.183 | 899.9 | | |
| 14.95 | 0.255 | 0.239 | | | |
| 16.38 | 0.331 | 0.301 | | | |
| 17.94 | 0.404 | 0.360 | | | |
| 19.65 | 0.455 | 0.409 | | | |
| 21.52 | 0.474 | 0.442 | | | |
| 23.58 | 0.461 | 0.455 | | | |
| 25.82 | 0.436 | 0.454 | | | |

FIG.6Bis

| Diameter of particle size class (left) μm | 00.$03 Diff. Volume % | 00.$04 Diff. Volume % | Diameter of particle size class (left) μm | 00.$03 Diff. Volume % | 00.$04 Diff. Volume % |
|---|---|---|---|---|---|
| 0.429 | 0 | 0 | 28.28 | 0.141 | 0.106 |
| 0.470 | 0 | 0 | 30.98 | 0.145 | 0.109 |
| 0.515 | 0 | 0 | 33.94 | 0.147 | 0.113 |
| 0.564 | 0 | 0 | 37.17 | 0.149 | 0.118 |
| 0.618 | 0 | 0 | 40.71 | 0.159 | 0.134 |
| 0.677 | 0 | 0 | 44.60 | 0.196 | 0.175 |
| 0.741 | 0 | 0 | 48.85 | 0.268 | 0.249 |
| 0.812 | 0 | 0 | 53.50 | 0.366 | 0.348 |
| 0.889 | 0 | 0 | 58.60 | 0.481 | 0.468 |
| 0.974 | 0 | 0 | 64.19 | 0.623 | 0.615 |
| 1.066 | 0 | 0 | 70.31 | 0.815 | 0.805 |
| 1.168 | 0 | 0 | 77.01 | 1.06 | 1.05 |
| 1.279 | 0 | 0 | 84.36 | 1.38 | 1.36 |
| 1.401 | 0 | 0 | 92.40 | 1.78 | 1.77 |
| 1.535 | 0 | 0 | 101.2 | 2.30 | 2.31 |
| 1.681 | 0 | 0 | 110.8 | 2.98 | 3.01 |
| 1.842 | 0 | 0 | 121.4 | 3.82 | 3.86 |
| 2.017 | 0 | 0 | 133.0 | 4.77 | 4.84 |
| 2.210 | 0 | 0 | 145.6 | 5.80 | 5.88 |
| 2.420 | 0.0048 | 0.0039 | 159.5 | 6.81 | 6.88 |
| 2.651 | 0.004 | 0.004 | 174.7 | 7.68 | 7.73 |
| 2.904 | 0.010 | 0.008 | 191.4 | 8.27 | 8.29 |
| 3.181 | 0.013 | 0.011 | 209.6 | 8.48 | 8.48 |
| 3.484 | 0.016 | 0.014 | 229.6 | 8.26 | 8.24 |
| 3.816 | 0.018 | 0.016 | 251.5 | 7.64 | 7.61 |
| 4.180 | 0.020 | 0.018 | 275.5 | 6.69 | 6.65 |
| 4.579 | 0.021 | 0.020 | 301.8 | 5.51 | 5.48 |
| 5.015 | 0.022 | 0.021 | 330.5 | 4.25 | 4.24 |
| 5.493 | 0.023 | 0.023 | 362.0 | 3.04 | 3.06 |
| 6.017 | 0.024 | 0.025 | 396.6 | 2.01 | 2.06 |
| 6.591 | 0.026 | 0.027 | 434.4 | 1.21 | 1.27 |
| 7.219 | 0.029 | 0.031 | 475.8 | 0.673 | 0.739 |
| 7.907 | 0.033 | 0.035 | 521.1 | 0.331 | 0.390 |
| 8.661 | 0.038 | 0.041 | 570.8 | 0.099 | 0.124 |
| 9.486 | 0.046 | 0.048 | 625.2 | 0.007 | 0.009 |
| 10.39 | 0.056 | 0.057 | 684.8 | 0 | 0 |
| 11.38 | 0.069 | 0.068 | 750.1 | 0 | 0 |
| 12.46 | 0.085 | 0.079 | 821.6 | 0 | 0 |
| 13.65 | 0.103 | 0.092 | 899.9 | | |
| 14.95 | 0.122 | 0.104 | | | |
| 16.38 | 0.138 | 0.114 | | | |
| 17.94 | 0.150 | 0.120 | | | |
| 19.65 | 0.154 | 0.121 | | | |
| 21.52 | 0.152 | 0.117 | | | |
| 23.58 | 0.146 | 0.111 | | | |
| 25.82 | 0.141 | 0.106 | | | |

FIG.7Bis

METHOD FOR OPERATING AN INTERNAL COMBUSTION ENGINE UTILIZING A CARBOHYDRATE-BASED FUEL MIXTURE

This application is a division of Ser. No. 10/297,623 filed Dec. 17, 2002 now U.S. Pat. No. 7,201,781, incorporated herein by reference, which is a filing under 35 USC 371 of PCT/FR01/01905, filed Jun. 19, 2001.

The invention relates to a solid fuel and a fuel mixture containing it.

The fuels most widely used at the present time for producing energy, particularly in internal combustion engines, are derived from the oil or gas industry.

However, depletion of the world resources of oil and gas products is causing problems of supply and cost.

Furthermore, the use of these fuel sources is giving rise to numerous problems of environmental pollution.

To overcome this problem, it was proposed to use catalytic converters and particle filters, which add to the manufacturing cost of the vehicle or other equipment running on this type of fuel.

It was then proposed to use nuclear energy or solar energy.

However, this gives rise to problems of environmental pollution and environmental safety and their use in engine-driven vehicles, particularly motor vehicles and aeroplanes, comes up against problems of storage, transport and hence cost.

Also, the risk of explosion of cereal grain dust in grain silos has been known for many years.

In fact, cereal grains produce dust which is highly explosive in contact with air. This high explosiveness of cereal grain dust in silos has been explained by their average particle size, which is below about 75 µm. Thus, when this cereal grain dust is suspended in a large amount of air in the presence of gases derived from fermentation of the cereal grains, the mixture of cereal grain dust, air and fermentation gases becomes explosive.

The object of the invention is to provide a fuel which is an alternative to the fuels derived from the oil, gas, nuclear or solar industry, whose transport or storage presents no difficulties, whose use produces no toxic waste and which is readily available and renewable.

For this purpose the invention proposes a solid fuel containing predominantly at least one constituent which in turn contains mainly at least one compound selected from the group comprising starch, lactose, cellulose and derivatives thereof, and at least 15% by weight of carbohydrates, based on the total weight of the constituent(s), the constituent(s) being in the form of a powder whose average particle diameter and median particle diameter are greater than or equal to 150 µm and preferably between 150 and 500 µm.

Preferably, at least about 70% by volume of said powder consists of particles with a diameter greater than or equal to 150 µm.

In a first embodiment of the fuel of the invention, said fuel is totally composed of said at least one constituent.

A particularly preferred solid fuel of the invention is one in which said at least one constituent is (are) selected from the group comprising a cereal flour, cotton flour, soybean flour, potato flour, cassava flour or tapioca, dehydrated chocolate powder, dehydrated milk powder and mixtures thereof.

If said at least one constituent is a cereal flour, the cereal is preferably wheat, rye, rice, maize, barley, sorghum, foxtail, millet, oats, bran, corn dredge, triticale, buckwheat or mixtures thereof.

In one preferred embodiment of the invention, said at least one constituent is cotton flour.

In another preferred embodiment of the invention, said at least one constituent is soybean flour.

Another flour which is particularly appropriate as a fuel of the invention is potato flour.

Yet another flour which is appropriate as a fuel of the invention is tapioca.

The solid fuel of the invention can also consist of dehydrated chocolate powder.

In yet another embodiment of the invention, the solid fuel of the invention consists of dehydrated milk powder.

Particularly preferably, the solid fuel of the invention consists of a mixture of two or more of said at least one constituent.

The invention further proposes a fuel mixture composed of the fuel of the invention suspended in air at a concentration of about 200 mg of fuel per liter of air.

The invention will be understood more clearly and other objects, characteristics, details and advantages thereof will become more clearly apparent from the following explanatory description referring to the attached Figures, in which:

FIG. 3bis shows the particle size curve of FIG. 3 in the form of numerical values;

FIG. 4bis shows the particle size curve of FIG. 4 in the form of numerical values;

FIG. 5bis shows the particle size curve of FIG. 5 in the form of numerical values;

FIG. 6bis shows the particle size curve of FIG. 6 in the form of numerical values;

FIG. 7bis shows the particle size curve of FIG. 7 in the form of numerical values.

Figure 1:
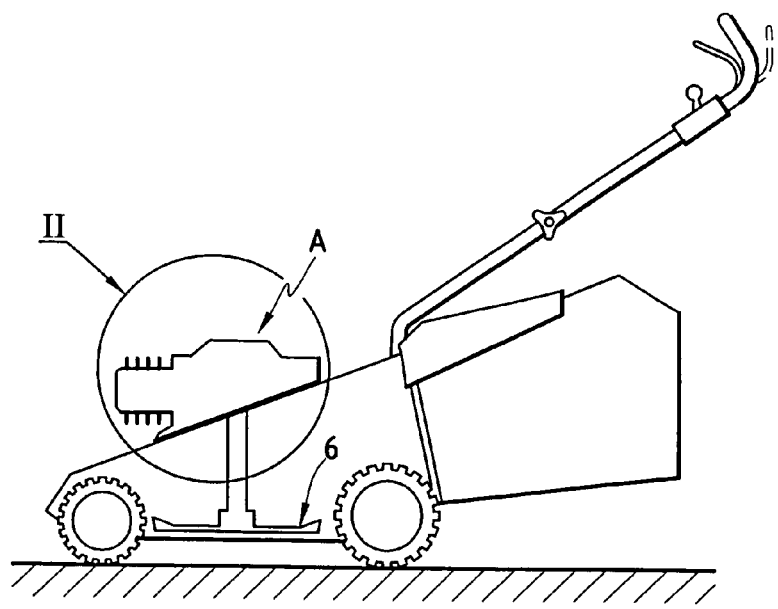
FIG. 1 is a diagrammatic side view of a commercial lawn mower.

The high explosiveness of cereal grain dust has always been considered to be the result of three factors:
- the particle size of the dust, the average particle diameter being below about 75 µm;
- the presence of gases originating from the fermentation of the grains themselves; and
- the presence of a large volume of air in which the dust particles are suspended.

However, this explosiveness phenomenon has never been reported or studied for the flours obtained industrially by grinding of the cereal grains themselves.

It has now been discovered, surprisingly, that cereal flour whose average particle diameter and median particle diameter are greater than or equal to 150 µm, and preferably between 150 and 500 µm, can be used as a solid fuel for running internal combustion engines in particular, and can thus replace oil or gas products.

This is particularly surprising and goes against a prejudice of the prior art.

The fact that cereal grain dust has a high explosiveness has never actually been considered as a reason for cereal grains being good fuels—quite the opposite.

Their good fuel quality is due first and foremost to the fact that, in the absence of turbulence, i.e. under laminar flow conditions, with a richness of 1, i.e. with a stoichiometric fuel:air ratio of 1:1, and at atmospheric pressure, the flame propagation velocity of hydrocarbons is about 0.4 m/s whereas that of edible cultivated flours is about 30 m/s.

Now, in an engine, the piston/valve device has the characteristic of increasing the turbulence in the combustion chamber almost in proportion to the speed of rotation of the engine.

This results in an increase in the combustion velocity.

In the case of hydrocarbons the combustion is combustion by deflagration and has a velocity of 20 m/s, whereas in the case of edible cultivated flours it is combustion by detonation, which is a characteristic of explosives, and can have a velocity of as much as 2000 m/s.

Now, in an engine, the propagation of an explosive wave causes the formation and propagation of shock waves, which propagate in the burnt or as yet unburnt gases.

On the one hand, these shock waves, which are detected by a loud pinging, drumming or knocking, have the effect of reducing the power of the engine and accelerating its wear. On the other hand, when they are diffracted or reflected, very high temperatures may be generated.

Thus, as regards their high combustion velocities under turbulent flow conditions, everything suggests that edible cultivated flours are inappropriate for use as fuels, particularly in internal combustion engines.

In addition, any product that appears a priori to be appropriate as a good fuel must have other physical and thermodynamic characteristics, namely, inter alia, compressibility or compression ratio, while at the same time having an acceptable self-ignition temperature, minimum ignition energy, enthalpy, volatility and frost resistance.

In fact, it is of interest to increase the compression in order to increase the thermal efficiency of an engine and, in all types of engine, there is a compression phase which heats the air or air/fuel mixture to a high temperature before the ignition/combustion phase. Now, when a gas is compressed, its temperature increases.

Thus, in a controlled ignition engine, the compression ratio is very quickly limited by the self-ignition of the intimate air/fuel mixture. This intimate air/fuel mixture is sucked into the cylinder and then compressed by the piston. The temperature at the end of the compression phase of the air/gasoline mixture is about 194° C. In this type of engine, everything is done to avoid self-ignition by compression.

Conversely, in a compression ignition engine or diesel engine, only the air is sucked into the cylinder and then compressed by the piston in a ratio that is at least twice as high as in the controlled ignition engine. The fuel is injected into the combustion chamber at the end of compression. This results in self-ignition of the diesel fuel in contact with the air, heated to a temperature of about 500° C.

Consequently, in contrast to the case of a controlled ignition engine, self-ignition in the case of a compression ignition engine is caused by compression.

Thus, in order to be able to replace gasoline or diesel fuel, the product put forward as a fuel must have a self-ignition temperature above 194° C. for use in a controlled ignition engine, and below 500° C. for use in a compression ignition engine.

Now, there is nothing in the prior art to indicate that edible cultivated flours are capable of fulfilling one of these requirements, let alone both.

Nevertheless, in the invention, the minimum ignition temperature of clouds of edible flours was determined experimentally in a Godbert-Greenwald furnace and it was then discovered that the minimum ignition temperatures are between 350° and 500° C.

Therefore, edible cultivated flours can replace gasoline are capable not only of replacing gasoline, but also of withstanding higher temperatures and hence higher compression ratios, which helps to increase the efficiency of the controlled ignition engine.

As far as the compression ignition engine is concerned, again they are capable of replacing diesel fuel advantageously.

The minimum ignition energy is the smallest amount of energy that has to be applied to a fuel in order to ignite it when it is mixed with air. It is often characterized by the energy of the spark of a capacitive discharge. Now, there is nothing in the prior art that suggests or discloses that the minimum ignition energy of edible cultivated flours is comparable to that of gases.

It has now been discovered that the lowest minimum ignition energy of edible cultivated flours is in the order of a millijoule, i.e. similar to that of gases. This minimum ignition energy of edible cultivated flours was determined experimentally in a Hartmann igniter.

Furthermore, liquid hydrocarbons such as gasoline, diesel fuel and kerosene have a specific calorific value, or enthalpy, of about 43 MJ/kg, whereas edible cultivated flours have a specific calorific value of only about 15 MJ/kg.

Here again, this thermodynamic property of edible cultivated flours suggests that they are not appropriate as heat engine fuels.

This is not the case at all.

In fact, the calorific value of 1 liter of a detonating mixture consisting of air and gasoline is 760 calories, whereas it has now been discovered that the calorific value of 1 liter of a detonating mixture consisting of air and flour is 703 calories.

Compared with gasoline, more than twice the amount of flour is burnt for the same volume of air. The stoichiometric ratio is 15.1 grams of air per gram of gasoline and 6.5 grams of air per gram of flour, i.e. a stoichiometric ratio equivalent to methanol.

Furthermore, as the basic motorized system is modified very little, the consumption ratio for the equivalence calculation simply corresponds to the ratio of the calorific values:

1 liter of gasoline=43 MJ×0.7 (density of gasoline)
=30 MJ 1 liter of flour=15 MJ×1.5 (density of edible cultivated flour)=22.5 MJ Consequently, 1.3 liters of flour are equivalent to 1 liter of gasoline.

As far as the frost resistance of edible cultivated flours is concerned, since said flours naturally contain about 15% by weight of water, there is every likelihood that they crystallize at a temperature below 0° C. As a result of this crystallization, they would lose their fluidity and form one or more compact and indissociable blocks.

Now, this is not the case: edible cultivated flours (tested to −20° C.) have a frost resistance not possessed by certain liquid fuels such as domestic fuels and gasoline, whose freezing points are −9° C. and −18° C. respectively.

Furthermore, they retain their fluidity at this temperature.

The value of an internal combustion engine fuel also depends on its volatility.

The volatility of a fuel is characterized by its density.

Now, where the density of gasolines is 0.7 and that of diesel fuels and kerosenes 0.8, the density of edible cultivated flours is 1.5.

Once again, this physical characteristic of edible flours does not augur in favor of their use as fuels.

However, as edible cultivated flours are pulverulent solids that are not converted to a gas phase for combustion, they are not subject to the well-known detrimental phenomenon of vaporlock exhibited by liquid fuels; this is one of their advantages.

Other physical characteristics of edible cultivated flours are such that the latter are dismissed by those skilled in the art of fuels.

In fact, in contrast to liquid hydrocarbons, edible cultivated flours are miscible with water and actually have a natural water content of up to 15% by weight, based on their total weight. This high water content lowers their calorific value and their combustion velocity while at the same time increasing their requisite minimum ignition energy.

Also, water increases the viscosity of edible cultivated flours and hence decreases the fluidity and volatility of the particles, which, depending on the degree of hydration, can go as far as a pasty amalgam (lumps) and even a very liquid consistency capable of stopping the engine.

Furthermore, the particles present in the powder formed by edible cultivated flours have a strong cohesion which gives rise to a phenomenon of agglomeration and sticking/adhesion on the walls of the receptacle containing them.

Thus, the greatest difficulties are to be anticipated when edible cultivated flours flow from the tank containing the fuel to the point where this fuel mixes with air.

Once again, this physical characteristic does not augur in favor of the use of edible cultivated flours as fuels.

Now, all these prejudices of the prior art and the problems mentioned above have been solved by the invention, which is based on the principle of choosing the particle sizes of the edible cultivated powders constituting the fuel of the invention.

In fact, choosing an edible cultivated powder with a particle size, i.e. an average diameter and a median diameter, greater than or equal to 150 µm, and preferably of between 150 and 500 µm, makes it possible to control the combustion velocity: increasing the size of the particles of edible cultivated powders decreases the surface area in contact with atmospheric oxygen, which is the oxidant. This results in a reduction in the oxidation rate.

Furthermore, the ash content, i.e. the content of minerals such as potassium, magnesium, calcium, phosphorus and sodium, in the edible cultivated powders constituting the fuel of the invention also acts as an anti-knock agent, like the lead tetraethyl formerly added to gasoline and now replaced by benzene and potassium.

In the same way, choosing this specific particle size solves the problem associated with their natural water content and the strong cohesion between the particles.

In fact, the amount of water absorbed and the rate of absorption by the particles of the edible cultivated powders of the invention decreases with the size of the particles.

Now, because of their high stability, storage of the flours requires no more precautions than that of liquid fuels, which are themselves sensitive to water.

As regards the problem of cohesion between the particles that results in the phenomenon of agglomeration, this problem can be surmounted by generating a vibration, as described below.

The average and median diameters of the solid fuels of the invention were measured by the COULTER laser method of particle size measurement on a Coulter LS apparatus.

The average diameter is the diameter calculated by the apparatus' software and represents the average diameter of the particles whose size is measured.

The median diameter corresponds to the particle size at which 50% by volume of the particles constituting the sample whose size is measured are smaller and 50% by volume of the particles constituting the sample whose size is measured are larger.

The more similar the average diameter and median diameter, the more the powder whose particle size is measured is homogeneous, i.e. has a single population.

In fact, the particle size distribution of the powder constituting the fuel of the invention is also an important criterion.

Preferably, the size distribution of the particles constituting the state of the invention is narrow, i.e. the fuel contains the smallest possible number of different particle size populations. This means that, in the fuel of the invention, more than 70% by volume of the particles constituting the powder must have a diameter greater than or equal to about 150 μm.

The term "flour" is understood here as meaning the flour produced industrially and used at the present time e.g. in the bakery industry. This flour can be used directly as fuel, without further conversion or treatment.

For example, it can be used to run internal combustion engines, whether of the controlled ignition type or diesel type, to run turbines and boilers, e.g. central heating boilers, and also to run industrial furnaces.

The composition of cereal flours varies according to the cereal and its cultivation conditions. It also depends on the grinding method used and the amounts of any additives introduced.

The cereal flours currently on the market contain predominantly starch, i.e. more than 70% of starch, water, proteins and a very small proportion of fats.

Thus the cereal flours used, which are usable as fuels according to the invention, contain predominantly starch and at least 15% by weight of carbohydrates.

Furthermore, these flours have an average particle diameter whose average diameter and median diameter are greater than or equal to 150 μm and preferably between 150 and 500 μm.

The particularly preferred flours are those in which more than 70% by volume of the particles have a diameter greater or equal to 150 μm.

The cereal flours used and tested in the invention are the flours of wheat, rye, rice, maize, barley, sorghum, foxtail, millet, oats, bran, corn dredge, triticale or buckwheat.

Some of these industrial flours currently on the market can have an average particle diameter and a median particle diameter below 150 μm.

The invention therefore has an additional advantage associated with the production cost of the flours which can be used as fuels of the invention.

In fact, to produce flours with an average particle diameter and a median particle diameter greater than or equal to 150 μm, and preferably of between 150 and 500 μm, the grain grinding and screening process for obtaining the conventional industrial flour can be stopped at an earlier stage.

The process for the production of the flours of the invention is therefore shorter and consequently more economic.

Also, it will be possible to use fractions obtained during flour production which would normally have been rejected because their average particle size was inappropriate for use in the food industry.

It has also been discovered that, surprisingly, other pulverulent industrial products in common use can be employed as fuels provided that they contain predominantly starch or cellulose, or a derivative thereof, and at least 15% by weight of carbohydrates, and that the average particle diameter and median particle diameter of the powder of these products are greater than or equal to 150 μm and preferably between 150 and 500 μm.

Said pulverulent products are cotton, soybean, potato and cassava flours. Cassava flour is commonly called tapioca.

Just as surprisingly, it has further been discovered that it is also possible to use dehydrated chocolate powder and dehydrated milk powder, which contain predominantly lactose or a lactose derivative and at least 15% by weight of carbohydrates, and whose average particle diameter and median particle diameter are greater than or equal to 150 μm and preferably between 150 and 500 μm.

Thus the invention is based on the surprising discovery that powders of commonly consumed natural products whose average particle diameter and median particle diameter are greater than or equal to 150 μm and preferably between 150 and 500 μm, and which contain predominantly at least one compound selected from the group comprising starch, a starch derivative, cellulose, a cellulose derivative, lactose, a lactose derivative and mixtures thereof, and at least 15% by weight of carbohydrates, constitute an excellent solid fuel.

The fuel of the invention can consist of a single powder, for example cotton flour on its own, but it can also be a mixture of two or more different powders, for example cotton flour plus soybean flour or cotton flour plus dehydrated milk powder.

It will be preferable to use a mixture of at least two flours with different average particle diameters and median particle diameters, because the combustion of the smallest flour particles will initiate the combustion of the larger particles.

Moreover, mixtures of several types of powders of different particle size and calorific value afford the desired thermodynamics and also make it possible to reduce the price of the fuel by mixing an inexpensive powder with a more expensive flour, as is the case for potato flour mixed with dehydrated chocolate powder.

The fuel of the invention can be used on its own or in a mixture with other fuels.

However, the fuel of the invention is not an additive for another fuel. It is well and truly a fuel in itself.

Because it consists of cereal, cotton, soybean or potato flour or dehydrated chocolate or dehydrated milk powder, this fuel does not produce any noxious discharges on combustion.

By way of example, wheat flour consists on average of 73.5% by weight of starch, 14.8% by weight of water, 10.8% by weight of proteins and 0.8% by weight of fats.

The combustion of wheat flour starch in the presence of air, i.e. essentially oxygen and nitrogen, discharges $CO_2$, water and nitrogen into the atmosphere. The combustion of proteins discharges water, $CO_2$, $SO_2$, nitrogen and traces of $SO_3$, $NH_3$ and $NO_x$.

Thus it is seen that the combustion of a wheat flour will produce predominantly water and nitrogen and about 18% of $CO_2$, which are non-toxic products. The amounts of $SO_3$, $NH_3$ and $NO_x$ produced by the combustion of such a flour are negligible.

The fuel of the invention is to be used as a suspension in air to produce a fuel mixture. The preferred proportion of fuel of the invention per liter of air is about 200 mg of fuel of the invention per liter of air.

The calorific value of one liter of the fuel mixture of the invention, when the fuel is wheat flour, is 703 calories. By way of comparison, the calorific value of one liter of air/gasoline mixture is 760 calories.

Thus, although the energy value of the fuel mixture of the invention is slightly less than that of gasoline (by 8%), it is nevertheless perfectly appropriate.

The discharges produced by combustion of the fuel mixture of the invention contain no lead, benzene, sulfur, hydrocarbons or carbon monoxide and a negligible amount of nitrogen oxides or solid particles.

The fuel of the invention can be used in modern internal combustion engines without major modification. Its calorific value is such that one liter of gasoline will have to be replaced in modern vehicles by about 1.3 l of fuel according to the invention.

It is seen from the above that the fuel of the invention has numerous advantages. It is economically more advantageous than oil products and liquefied gases, it is available in abundance and it is an indefinitely renewable source of energy. It is biodegradable, has a neutral greenhouse effect and is easy to store.

In fact, although the composition of the combustion discharges of edible cultivated flours includes $CO_2$, in the same way as liquid hydrocarbons, combustion of the powders of edible cultivated products as defined in the invention serves only to restore the $CO_2$ absorbed during the growth of the plants from which they are derived; this is in contrast to products of fossil origin, which massively shift the earth's carbon reserves into the atmosphere as carbon dioxide. Combustion of the fuel of the invention is therefore neutral in terms of the greenhouse effect.

Furthermore, the handling of the fuels of the invention presents no danger to humans. In fact, as the fuel of the invention consists of particles whose average diameter and median diameter are greater than or equal to 150 μm, there is no risk of this fuel exploding in the event of a violent shock.

Because it consists of edible products, the fuel of the invention also presents no danger when inhaled or ingested.

Another advantage of the invention is that, by mixing the different powders described here, it is possible to choose the odor released on combustion.

To provide a clearer understanding of the subject of the invention, several modes of carrying out the invention will now be described by way of purely illustrative and non-limiting Examples.

EXAMPLES

The experiments using the fuel of the invention were performed on a commercial lawn mower originally running on gasoline, as shown in FIG. 1.

As seen in FIG. 1, this lawn mower is equipped with a gasoline tank marked A, located above the carburetor, which gravity-feeds the carburetor with gasoline. The lawn mower engine runs under constant flow conditions and the grass cutting blade, marked 6 in FIG. 1, engages directly with the mower engine. Each rotation of the cutting blade 6 thus corresponds to one rotation of the engine.

Few modifications were made to run the engine on the fuel of the invention.

Only the fuel tank and the part where the fuel is sucked into the carburetor were modified on this lawn mower.

Figure 2:
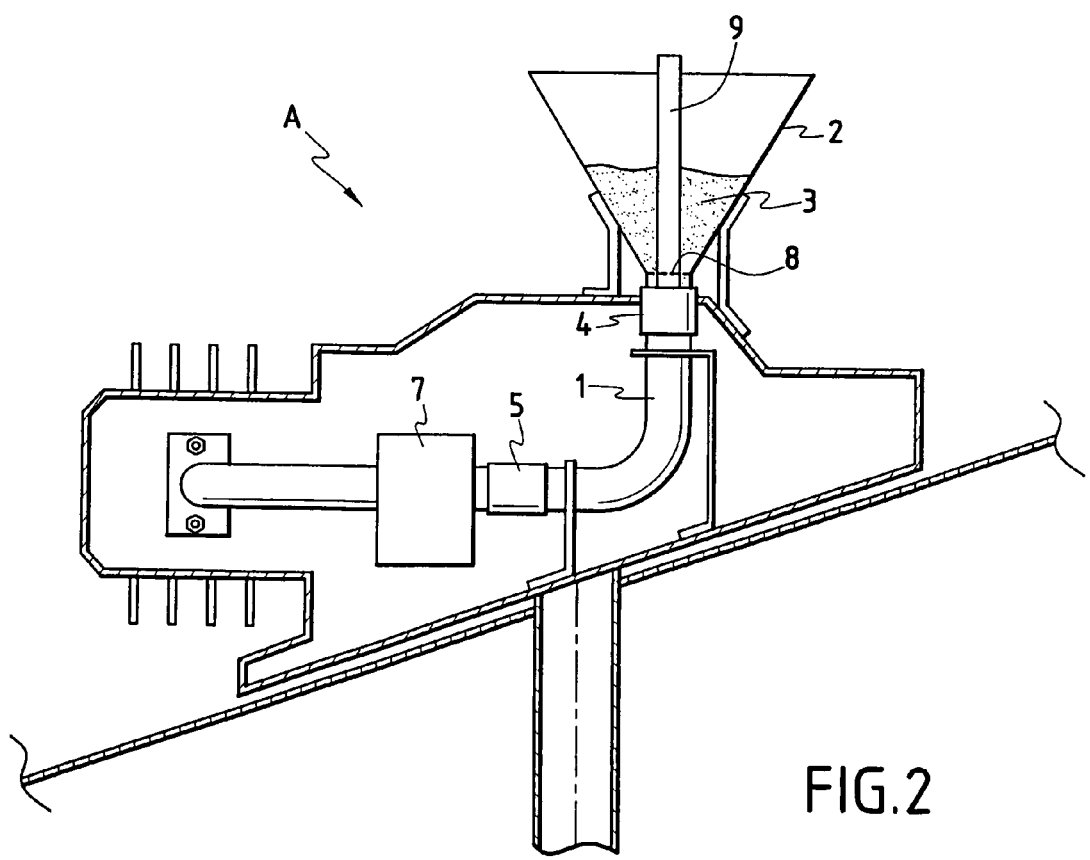
FIG. 2 shows an enlarged section of the part marked II in FIG. 1, modified to run on the fuel of the invention.

These modifications are shown in FIG. 2, which is an enlarged view of the part marked II in FIG. 1. As shown in FIG. 2, in which the unmodified carburetor of the commercial lawn mower is marked 7, the air filter of the commercial lawn mower has been removed and replaced with a bent tube, marked 1 in FIG. 2, made of a rigid material such as metal or PVC.

At one of these ends, this bent tube 1 is joined to the air intake of the carburetor 7 by a connector, marked 5 in FIG. 2, made of a flexible material.

The other end of the bent tube 1 is joined to the tank, marked 2 in FIG. 2, by a connector 4, the tank 2 containing the powdered fuel of the invention, marked 3 in FIG. 2.

This tank 2 is open at its top end to allow a permanent air supply, and is fitted at its bottom end with a perforated plate, marked 8 in FIG. 2, to allow the fuel 3 to pass through. The size and number of the perforations in the perforated plate 8 are graded so as to allow the desired ratio of weight of fuel to volume of air to pass through.

The tank 2 is also fitted with an air passage, marked 9 in FIG. 2, providing the lawn mower engine with an air supply. As shown in FIG. 2, this air passage 9 can be a central air passage located on the perforated plate 8.

It may also be located at the side of the perforated plate 8. The air passage may equally well be located in any other place on condition that it provides the lawn mower engine with an air supply.

Thus the diameter and/or number of the perforations will be varied according to the desired ratio of weight of fuel to volume of air and the desired flow rate of the fuel.

The tank 2 is located above the carburetor 7 in order to feed it by gravity and air suction. The air/fuel mixture is formed at the point where the air and flour meet downstream, i.e. underneath the perforated plate 8.

In order to introduce the desired amount of fuel of the invention at the desired flow rate, it is also necessary to induce the tank 2 to vibrate.

This can be achieved by any appropriate means known to those skilled in the art. However, in the working tests performed here, this vibration is created by placing a weight on the end of the grass cutting blade 6 shown in FIG. 1. This weight unbalances the cutting blade 6, thereby inducing the tank 2 to vibrate each time the cutting blade 6 rotates, i.e. each time the engine rotates.

Example 1

Commercial dehydrated chocolate powder was used as fuel for the lawn mower modified as indicated above.

Figure 3:
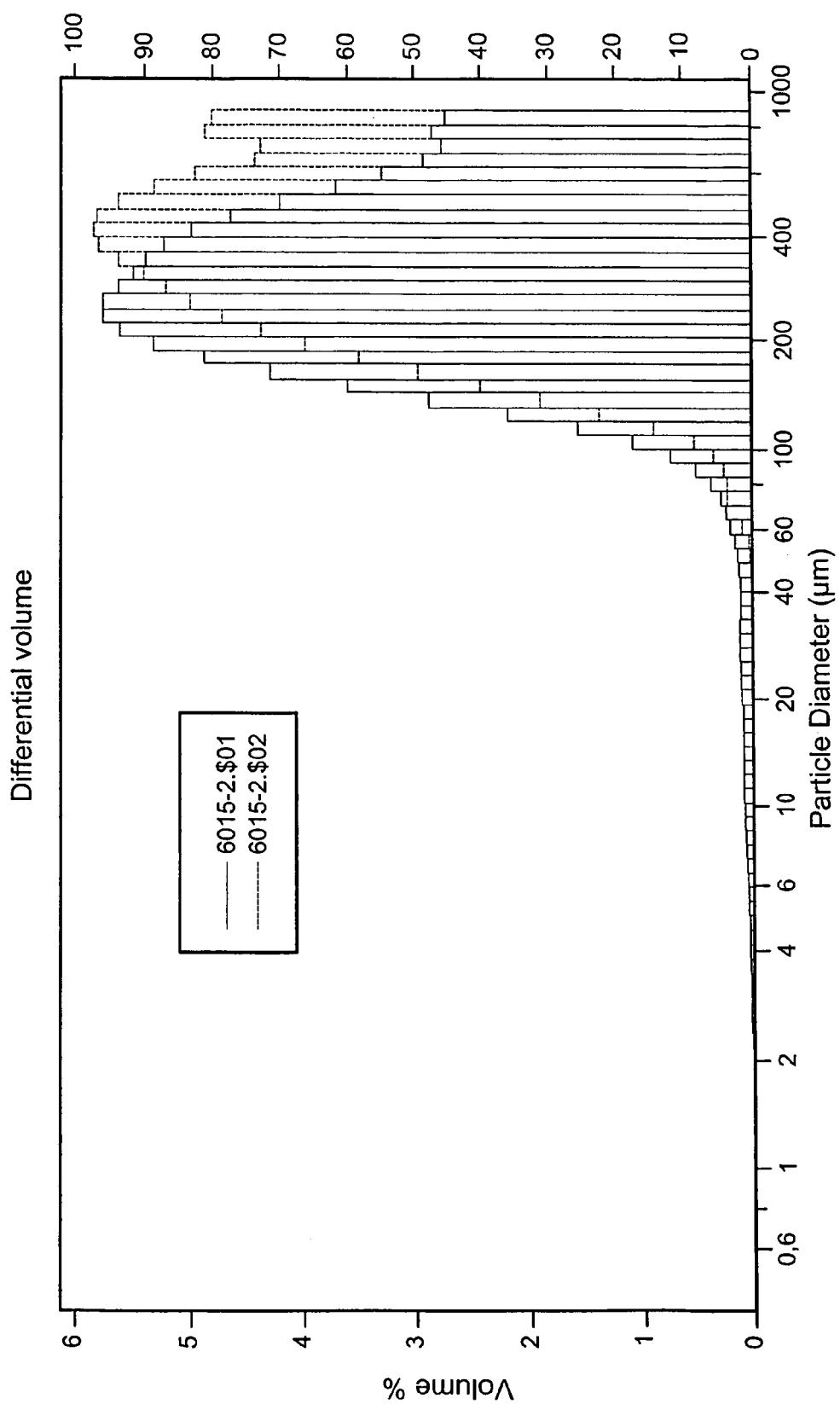
FIG. 3 shows the particle size curve, measured with a Coulter LS laser granulometer, of a commercial dehydrated chocolate powder used in Example 1.

The particle size distribution of this chocolate powder is shown in the form of a curve in FIG. 3 and in the form of numerical values in FIG. 3*bis*.

Two successive particle size measurements were made on this powder, so FIGS. 3 and 3*bis* show the values found for each of these two measurements.

In FIG. 3 the first measuring experiment is marked 6015-2. $ 01 and is shown as a solid line, and the second measuring experiment is marked 6015-2 $ 02 and is shown as a broken line.

The average particle diameter of the commercial dehydrated chocolate powder is 281.2 µm for the first measurement and 357.1 µm for the second measurement.

The median diameter is 290.4 µm in the first experiment and 370.3 µm in the second experiment.

As can be seen, the average diameter and the median diameter of this powder are very similar; this indicates a narrow particle size distribution, as shown in FIG. 3.

In both the measuring experiments, more than 70% by volume of the particles of chocolate powder have diameters greater than 150 µm.

The lawn mower ran on this fuel without any problems until the dehydrated chocolate powder contained in the tank 2 was exhausted.

Example 2

The same experiment as in Example 1 was performed except that commercial dehydrated milk powder was used; its particle size was measured as in Example 1.

Also in this case, two particle size measurements were made on the dehydrated milk powder.

Figure 4:
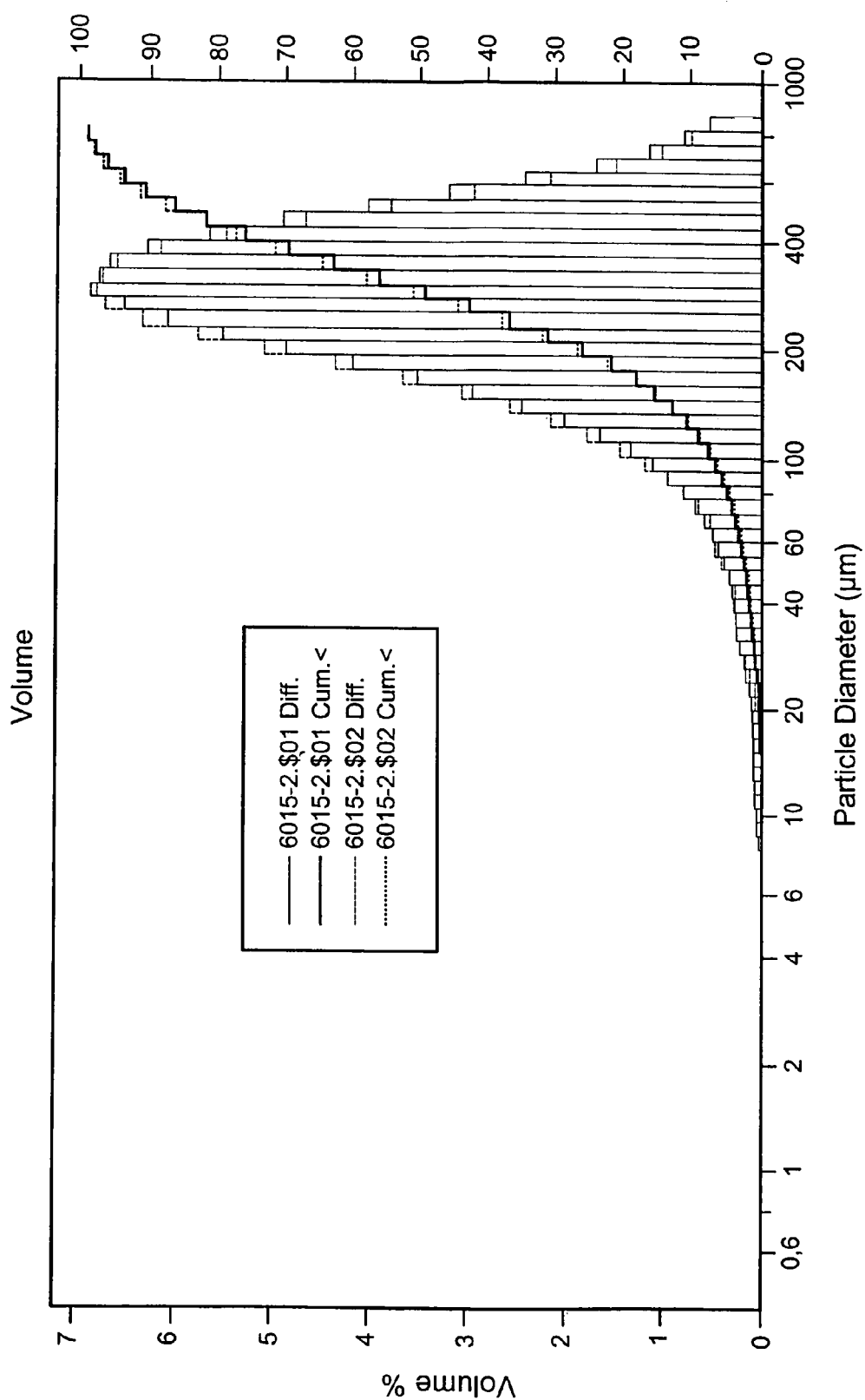
FIG. 4 shows the particle size curve, measured with a Coulter LS laser granulometer, of a commercial dehydrated milk powder used in Example 2.

The results are shown in FIG. 4 in the form of a curve and in FIG. 4*bis* in the form of numerical values. The first measurement is marked 6015-1. $ 01 and is shown as a solid line in FIG. 4, and the second measurement is marked 6015-1. $ 02 and is shown as a broken line in FIG. 4.

The average diameter of the dehydrated milk particles is 254.4 µm for the first measurement and 251.5 µm for the second measurement.

The median diameter is 279.1 µm for the first measurement and 272.9 µm for the second measurement.

Here again, more than 70% by volume of the particles of this milk powder have a diameter greater than 150 µm.

In the same way as in Example 1, the lawn mower ran until the dehydrated milk powder contained in the tank 2 was exhausted.

Example 3

The same experiment as in Examples 1 and 2 was performed except that the fine middlings fraction of a wheat flour was used.

The fine middlings fraction of a wheat flour is one of the fractions normally rejected after the wheat grains have been ground and screened in the process for the production of wheat flours for use in food.

The object of the screening operation is to purify the semolina originating from the grinding of the grain.

Two particle size measurements were made on this fine middlings fraction.

Figure 5:
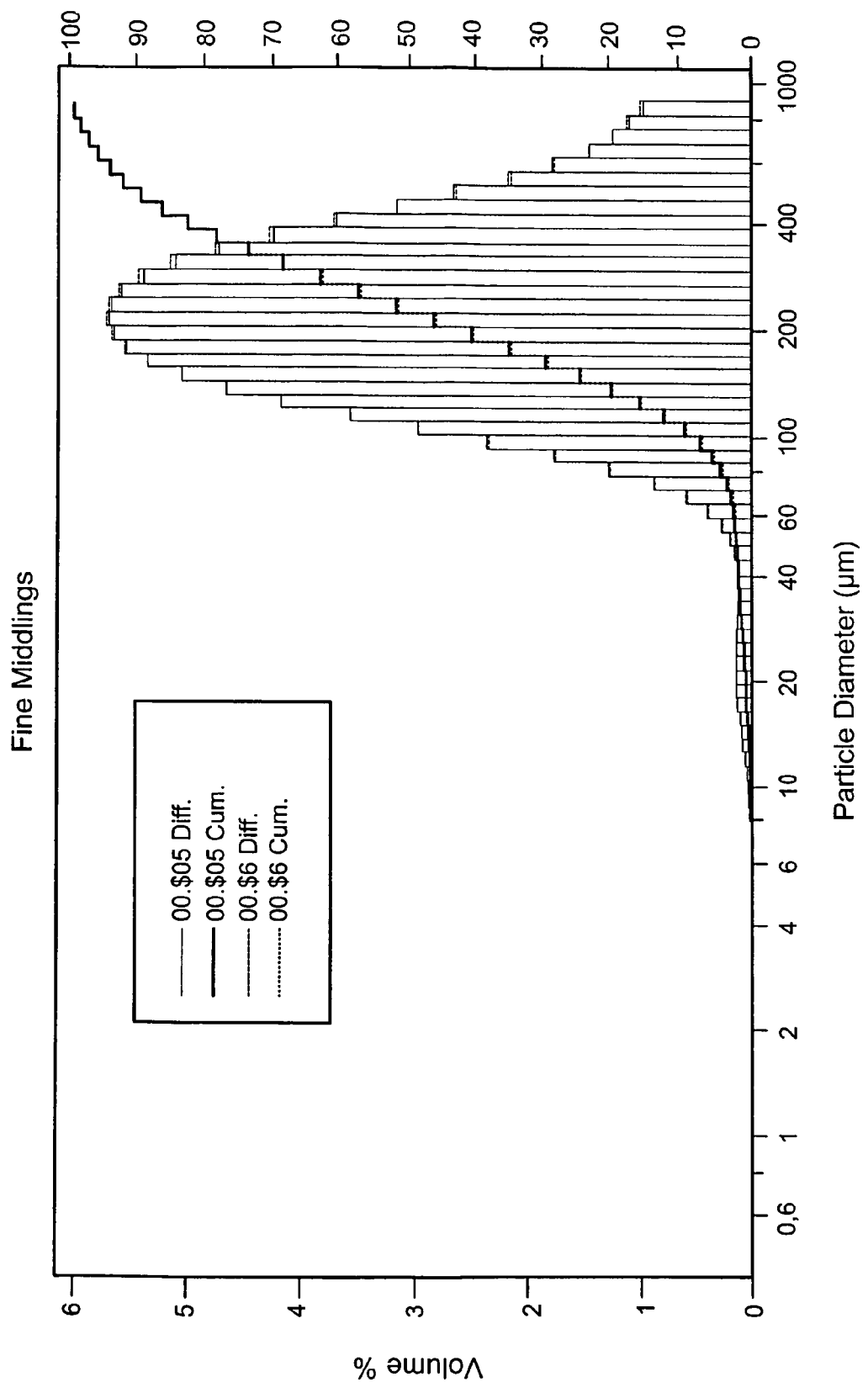
FIG. 5 shows the particle size curve, measured with a Coulter LS laser granulometer, of a fine middlings fraction of a wheat flour used in Example 3.

The results of the particle size measurements made on this fine middlings fraction are shown in FIG. 5 in the form of a curve and in FIG. 5*bis* in the form of numerical values. The first measurement is marked 00. $ 05 and is shown as a solid line in FIG. 5, and the second is marked 00. $ 06 and is shown as a broken line in FIG. 5.

The average diameter of this fine middlings fraction is 217.3 µm for the first measurement and 218.7 µm for the second measurement.

The median diameter is 222.7 µm for the first measurement and 223.4 µm for the second measurement.

For this fine middlings fraction, more than 70% by volume of the particles have a diameter greater than 150 µm.

In the same way, the mower ran until the flour contained in the tank 2 was exhausted.

Example 4

The same experiment as in Examples 1, 2 and 3 above was performed except that a coarse middlings fraction of a wheat flour was used.

The coarse middlings fraction of a wheat flour is also one of the fractions normally rejected after the wheat grains have been ground and screened in the process for the production of a wheat flour for use in food.

Figure 6:
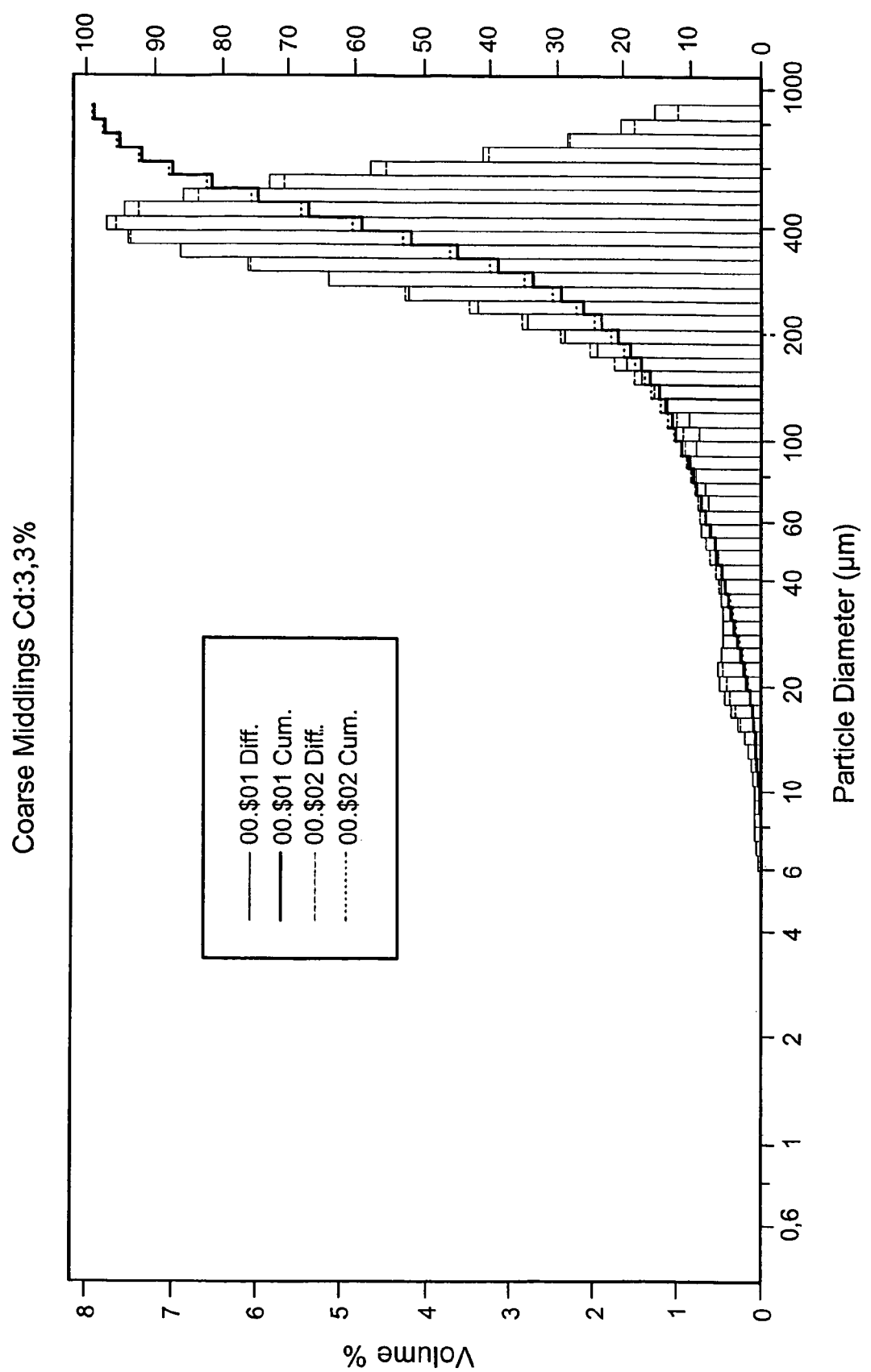
FIG. 6 shows the particle size curve, measured with a Coulter LS laser granulometer, of a coarse middlings fraction used in Example 4.

The results of the particle size measurements made on this coarse middlings fraction are shown in FIG. 6 in the form of a curve and in FIG. 6bis in the form of numerical values.

Two particle size measurements were made on this coarse middlings fraction. The first measurement is marked 00. $ 01 and is shown as a solid line in FIG. 6. The second measurement is marked 00. $ 02 and is shown as a broken line in FIG. 6.

The average diameter of this coarse middlings fraction is 277.9 µm for the first measurement and 273.4 µm for the second measurement.

The median diameter is 355.1 µm for the first measurement and 349.0 µm for the second measurement.

The coarse middlings fraction used in this Example comprises more than 70% by volume of particles with a diameter greater than 150 µm.

In the same way as in the previous Examples, the lawn mower ran until the flour contained in the tank 2 was exhausted.

Example 5

The same experiment as in Examples 1 to 4 above was performed except that a different coarse middlings fraction of a wheat flour was used.

Figure 7:
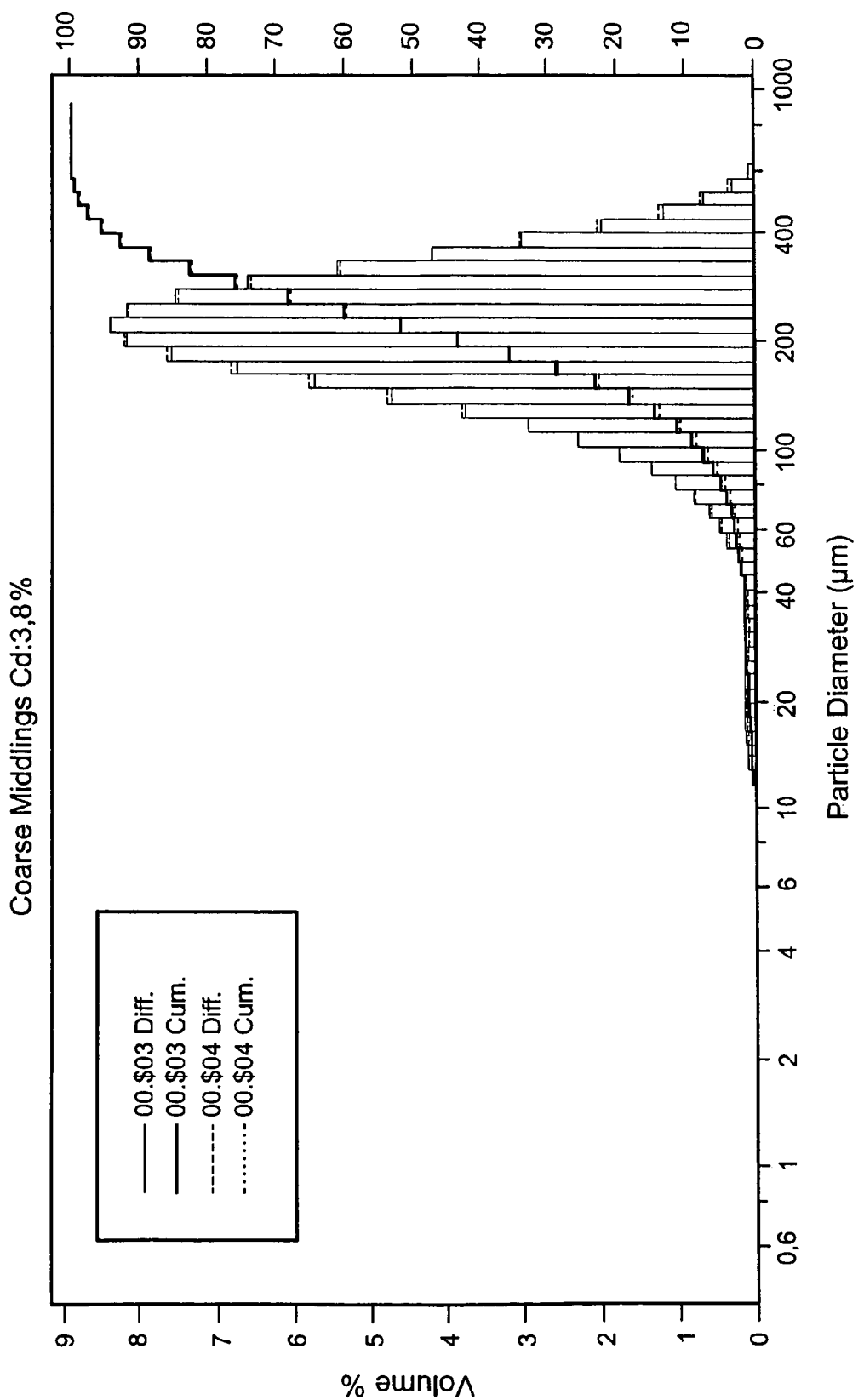
FIG. 7 shows the particle size curve, measured with a Coulter LS laser granulometer, of a coarse middlings fraction used in Example 5.

The results of the particle size measurements made on this coarse middlings fraction as shown in FIG. 7 in the form of a curve and in FIG. 7bis in the form of numerical values.

Two particle size measurements were made on this coarse middlings fraction. The first measurement is marked 00. $ 03 and is shown as a solid line in FIG. 7. The second measurement is marked 00. $ 04 and is shown as a broken line in FIG. 7.

The average diameter of the is coarse middlings fraction is 190.2 µm for the first measurement and 192.2 µm for the second measurement.

The median diameter of the particles of this coarse middlings fraction is 205.6 µm for the first measurement and 206.0 µm for the second measurement.

More than 70% by volume of the particles of this coarse middlings fraction have a diameter greater than 150 µm.

In the same way as in Examples 1 to 4, the lawn mower ran until the flour contained in the tank 2 was exhausted.

Of course, the invention is in no way limited to the embodiments described and illustrated, which have been given only as purely illustrative and non-limiting Examples.

Thus the fuels and fuel mixture of the invention can be used to run internal combustion engines, such as controlled ignition engines and compression ignition engines, gas turbines, turbojet engines, ram jet engines and pulse jet engines, i.e. not only motor vehicle engines but also engines used in the aeronautical sector.

They can also be used in external combustion engines, such as steam turbines and reciprocating steam engines, Stirling cycle engines and static engines, such as generator sets or pumps.

Likewise, the fuel and fuel mixture of the invention may be used to run boilers, for example central heating boilers, or furnaces in all types of industry.

In other words, the invention embraces all the technical equivalents of the means described, as well as combinations thereof if these are effected according to the spirit and scope of the invention as defined in the claims which follow.

In summary, the fuel as defined in the invention can be used as a replacement for liquid, solid or gaseous energy sources such as gasoline, diesel fuel, kerosene, fuel oil, pulverized coal, ordinary coal, butane, propane, ethanol, methanol, etc.

The invention claimed is:

1. A method for operating an internal combustion engine comprising providing to the engine a solid fuel comprising at least one constituent selected from the group consisting of a cereal flour, a cotton flour, a soybean flour, a potato flour, a cassava flour, a dehydrated chocolate powder and a dehydrated milk powder, said solid fuel being in the form of a powder having an average particle diameter and median particle diameter of at least 150 µm.

2. The method according to claim 1, wherein said step of providing comprises providing more than 70% by volume of said powder of particles with diameters of at least 150 µm.

3. The method according to claim 1, wherein said step of providing comprises providing the powder with average and median particle diameters between 150 and 500 µm.

4. The method according to claim 2, wherein said step of providing comprises providing the powder with average and median particle diameters between 150 and 500 µm.

5. The method according to claim 1, wherein said step of providing comprises providing the powder with at least one constituent selected from the group consisting wheat flour, rye flour, maize flour, barley flour, sorghum flour, foxtail flour, millet flour, oat flour, bran flour, buckwheat flour, corn dredge flour, triticale flour, rice flour and mixtures thereof.

6. The method according to claim 2, wherein said step of providing comprises providing the powder with at least one constituent selected from the group consisting of wheat flour, rye flour, maize flour, barley flour, sorghum flour, foxtail flour, millet flour, oat flour, bran flour, buckwheat flour, corn dredge flour, triticale flour, rice flour and mixtures thereof.

7. The method according to claim 1, wherein said step of providing comprises providing the powder containing cotton flour.

8. The method according to claim 1, wherein said step of providing comprises providing the powder containing soybean flour.

9. The method according to claim 1, wherein said step of providing comprises providing the powder containing potato flour.

10. The method according to claim 1, wherein said step of providing comprises providing the powder containing cassava flour.

11. The method according to claim 1, wherein said step of providing comprises providing the powder containing dehydrated chocolate powder.

12. The method according to claim 1, wherein said step of providing comprises providing the powder containing dehydrated milk powder.

13. The method according to claim 1, wherein said step of providing comprises providing the powder containing a mixture of at least two of a cereal flour, a cotton flour, a soybean flour, a potato flour, a cassava flour, a dehydrated chocolate powder and a dehydrated milk powder.

14. The method according to claim 1, wherein said step of providing comprises supplying the fuel in the form of a suspension of the powder in air at a concentration of about 200 mg of fuel per liter of air.

15. A method for operating a combustion engine comprising providing to the engine a fuel comprising a solid fuel comprising at least 15% by weight of carbohydrates, said solid fuel being in the form of a powder having an average particle diameter and median particle diameter greater than or equal to 150 µm, wherein said solid fuel comprises at least one constituent selected from the group consisting of a cereal flour, a cotton flour, a soybean flour, a potato flour, a cassava flour, a dehydrated chocolate powder and a dehydrated milk powder.

16. The method of claim 15, wherein the average particle diameter and median particle diameter are between 150 and 500 µm.

17. The method of claim 15, wherein said combustion engine is an external combustion engine.

18. The method of claim 17, wherein said external combustion engine is selected from the group consisting of a steam turbine, a reciprocating steam engine, a Stirling cycle engine, a static engine, a boiler, and an industry furnace.

19. A method for operating a combustion engine comprising providing to the engine a fuel comprising a solid fuel comprising at least 15% by weight of carbohydrates, said solid fuel being in the form of a powder having an average particle diameter and median particle diameter greater than or equal to 150 µm,
wherein said solid fuel consists essentially of at least one constituent selected from the group consisting of a cereal flour, a cotton flour, a soybean flour, a potato flour, a cassava flour, a dehydrated chocolate powder and a dehydrated milk powder.

20. A method for operating a combustion engine comprising providing to the engine a fuel comprising a solid fuel comprising at least 15% by weight of carbohydrates, said solid fuel being in the form of a powder having an average particle diameter and median particle diameter greater than or equal to 150 µm,
wherein said fuel comprises a blend of said solid fuel with a second fuel energy source selected from the group consisting of a liquid fuel energy source, a solid fuel energy source, and a gaseous fuel energy source.

21. The method of claim 20, wherein said second fuel energy source is selected from the group consisting of gasoline, diesel fuel, kerosene, fuel oil, pulverized coal, ordinary coal, butane, propane, ethanol, and methanol.

22. The method of claim 20, wherein the average particle diameter and median particle diameter are between 150 and 500 µm.

23. The method of claim 20, wherein the combustion engine is an external combustion engine.

24. The method of claim 23, wherein the external combustion engine is selected from the group consisting of a steam turbine, a reciprocating steam engine, a Stirling cycle engine, a static engine, a boiler and an industry furnace.

25. The method of claim 20, wherein the solid fuel comprises at least one constituent selected from the group consisting of a cereal flour, a cotton flour, a soybean flour, a potato flour, a cassava flour, a dehydrated chocolate powder and a dehydrated milk powder.

26. The method of claim 20, wherein the solid fuel comprises at least one constituent selected from the group consisting of wheat flour, rye flour, maize flour, barley flour, sorghum flour, foxtail flour, millet flour, oat flour, bran flour, buckwheat flour, corn dredge flour, triticale flour, rice flour and mixtures thereof.

* * * * *